US008495380B2

(12) United States Patent
Fu et al.

(10) Patent No.: US 8,495,380 B2
(45) Date of Patent: *Jul. 23, 2013

(54) METHODS AND SYSTEMS FOR SERVER-SIDE KEY GENERATION

(75) Inventors: Christina Fu, Mountain View, CA (US); Steven William Parkinson, Mountain View, CA (US); Nang Kon Kwan, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1429 days.

This patent is subject to a terminal disclaimer.

(21) Appl. No.: 11/446,957

(22) Filed: Jun. 6, 2006

(65) Prior Publication Data

US 2008/0022121 A1 Jan. 24, 2008

(51) Int. Cl.
*H04L 9/3294* (2006.01)
*H04L 9/08* (2006.01)

(52) U.S. Cl.
USPC .......................................... 713/185; 380/277

(58) Field of Classification Search
USPC .......... 713/185, 183, 182, 184, 186; 380/286, 380/277; 726/35, 36; 382/115; 340/5.82
See application file for complete search history.

(56) References Cited

U.S. PATENT DOCUMENTS

| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A * | 5/1997 | Mills et al. ................ 380/286 |
| 5,666,415 A | 9/1997 | Kaufman |
| 5,721,781 A | 2/1998 | Deo et al. |
| 5,745,576 A | 4/1998 | Abraham et al. |
| 5,745,678 A | 4/1998 | Herzberg et al. |
| 5,768,373 A | 6/1998 | Lohstroh et al. |
| 5,862,310 A | 1/1999 | Crawford et al. |
| 5,923,884 A | 7/1999 | Peyret et al. |
| 5,937,066 A | 8/1999 | Gennaro et al. |
| 5,943,423 A | 8/1999 | Muftic |
| 5,991,411 A | 11/1999 | Kaufman et al. |
| 5,991,882 A | 11/1999 | O'Connell |
| 6,005,942 A | 12/1999 | Chan et al. |

(Continued)

FOREIGN PATENT DOCUMENTS

| WO | 9724831 | 7/1997 |
| WO | 0048064 A1 | 8/2000 |
| WO | 2007096590 A1 | 8/2007 |

OTHER PUBLICATIONS

ATM and Credit Card Notification, Feb. 2005 (internet archive) pp. 1-2 www.thereareplaces.com/infgdes/money.atmnotif.htm.

(Continued)

*Primary Examiner* — Eleni Shiferaw
*Assistant Examiner* — Abu Sholeman
(74) *Attorney, Agent, or Firm* — Lowenstein Sandler LLP

(57) ABSTRACT

A method and system for generating credentials for a token. A server detects a token, determines that the token is to be enrolled, and generates a subject key pair that includes a subject public key and subject private key. The server encrypts the subject private key with a key transport session key to obtain a wrapped private key and forwards the wrapped private key to the token.

18 Claims, 4 Drawing Sheets

U.S. PATENT DOCUMENTS

| | | | |
|---|---|---|---|
| 6,005,945 A | 12/1999 | Whitehouse | |
| 6,011,847 A | 1/2000 | Follendore, III | |
| 6,016,476 A | 1/2000 | Maes et al. | |
| 6,044,155 A | 3/2000 | Thomlinson et al. | |
| 6,072,876 A | 6/2000 | Obata et al. | |
| 6,141,420 A | 10/2000 | Vanstone et al. | |
| 6,178,507 B1 | 1/2001 | Vanstone | |
| 6,179,205 B1 | 1/2001 | Sloan | |
| 6,226,744 B1 | 5/2001 | Murphy et al. | |
| 6,246,771 B1* | 6/2001 | Stanton et al. | 380/286 |
| 6,377,825 B1 | 4/2002 | Kennedy et al. | |
| 6,490,680 B1 | 12/2002 | Scheidt et al. | |
| 6,502,108 B1 | 12/2002 | Day et al. | |
| 6,539,093 B1 | 3/2003 | Asad et al. | |
| 6,636,975 B1 | 10/2003 | Khidekel et al. | |
| 6,643,701 B1 | 11/2003 | Aziz et al. | |
| 6,687,190 B2 | 2/2004 | Momich et al. | |
| 6,691,137 B1 | 2/2004 | Kishi | |
| 6,698,654 B1 | 3/2004 | Zuppicich | |
| 6,714,678 B2* | 3/2004 | Lapstun et al. | 382/187 |
| 6,734,886 B1 | 5/2004 | Hagan et al. | |
| 6,760,752 B1* | 7/2004 | Liu et al. | 709/206 |
| 6,775,382 B1* | 8/2004 | Al-Salqan | 380/286 |
| 6,804,687 B2 | 10/2004 | Sampson | |
| 6,819,766 B1 | 11/2004 | Weidong | |
| 6,826,686 B1 | 11/2004 | Peyravian et al. | |
| 6,829,712 B1 | 12/2004 | Madoukh | |
| 6,880,037 B2 | 4/2005 | Boyer | |
| 6,880,084 B1 | 4/2005 | Brittenham et al. | |
| 6,898,605 B2 | 5/2005 | Constantino | |
| 6,898,714 B1 | 5/2005 | Nadalin et al. | |
| 6,931,133 B2 | 8/2005 | Andrews et al. | |
| 6,941,326 B2 | 9/2005 | Kadyk et al. | |
| 6,950,523 B1* | 9/2005 | Brickell et al. | 380/286 |
| 6,970,970 B2 | 11/2005 | Jung et al. | |
| 6,978,019 B1* | 12/2005 | Lapstun et al. | 380/51 |
| 6,978,933 B2 | 12/2005 | Yap et al. | |
| 6,986,040 B1 | 1/2006 | Kramer et al. | |
| 7,007,105 B1 | 2/2006 | Sullivan et al. | |
| 7,010,600 B1 | 3/2006 | Prasad et al. | |
| 7,050,589 B2 | 5/2006 | Kwan | |
| 7,051,213 B1 | 5/2006 | Kobayashi et al. | |
| 7,085,386 B2 | 8/2006 | Audebert et al. | |
| 7,114,028 B1 | 9/2006 | Green et al. | |
| 7,134,024 B1* | 11/2006 | Binding et al. | 713/187 |
| 7,156,302 B2 | 1/2007 | Yap et al. | |
| 7,159,763 B2 | 1/2007 | Yap et al. | |
| 7,185,018 B2 | 2/2007 | Archbold et al. | |
| 7,251,728 B2* | 7/2007 | Toh et al. | 713/156 |
| 7,278,581 B2 | 10/2007 | Ong | |
| 7,296,149 B2* | 11/2007 | Hiltgen | 713/161 |
| 7,299,364 B2 | 11/2007 | Noble et al. | |
| 7,302,585 B1 | 11/2007 | Proudler et al. | |
| 7,356,688 B1 | 4/2008 | Wang | |
| 7,374,099 B2 | 5/2008 | de Jong | |
| 7,386,705 B2 | 6/2008 | Low et al. | |
| 7,437,757 B2 | 10/2008 | Holdsworth | |
| 7,440,465 B2* | 10/2008 | Park | 370/401 |
| 7,451,921 B2 | 11/2008 | Dowling et al. | |
| 7,475,250 B2* | 1/2009 | Aull et al. | 713/173 |
| 7,475,256 B2 | 1/2009 | Cook | |
| 7,480,384 B2 | 1/2009 | Peyravian et al. | |
| 7,502,793 B2 | 3/2009 | Snible et al. | |
| 7,506,153 B2* | 3/2009 | Lapstun et al. | 713/150 |
| 7,512,800 B2* | 3/2009 | Hopkins | 713/172 |
| 7,571,321 B2 | 8/2009 | Appenzeller et al. | |
| 7,602,910 B2 | 10/2009 | Johansson et al. | |
| 7,702,917 B2 | 4/2010 | Tevosyan et al. | |
| 7,769,996 B2 | 8/2010 | Randle et al. | |
| 7,822,209 B2* | 10/2010 | Fu et al. | 380/284 |
| 7,860,243 B2 | 12/2010 | Zheng et al. | |
| 7,877,799 B2* | 1/2011 | Proudler | 726/21 |
| 7,949,868 B2* | 5/2011 | Lapstun et al. | 713/150 |
| 8,098,829 B2* | 1/2012 | Fu et al. | 380/286 |
| 2001/0008012 A1 | 7/2001 | Kausik | |
| 2001/0036276 A1 | 11/2001 | Ober et al. | |
| 2001/0054148 A1 | 12/2001 | Hoornaert et al. | |
| 2002/0004816 A1 | 1/2002 | Vange et al. | |
| 2002/0007351 A1 | 1/2002 | Hillegass et al. | |
| 2002/0007359 A1 | 1/2002 | Nguyen | |
| 2002/0010679 A1 | 1/2002 | Felsher | |
| 2002/0023212 A1* | 2/2002 | Proudler | 713/164 |
| 2002/0029343 A1 | 3/2002 | Kurita | |
| 2002/0056044 A1 | 5/2002 | Andersson | |
| 2002/0059144 A1 | 5/2002 | Meffert et al. | |
| 2002/0064095 A1 | 5/2002 | Momich et al. | |
| 2002/0067832 A1* | 6/2002 | Jablon | 380/277 |
| 2002/0080958 A1 | 6/2002 | Ober et al. | |
| 2002/0099727 A1 | 7/2002 | Kadyk et al. | |
| 2002/0112156 A1 | 8/2002 | Gien et al. | |
| 2002/0120842 A1 | 8/2002 | Bragstad et al. | |
| 2002/0133707 A1 | 9/2002 | Newcombe | |
| 2002/0171546 A1 | 11/2002 | Evans et al. | |
| 2002/0184149 A1 | 12/2002 | Jones | |
| 2002/0188848 A1 | 12/2002 | Buttiker | |
| 2003/0005291 A1 | 1/2003 | Burn | |
| 2003/0012386 A1* | 1/2003 | Kim et al. | 380/286 |
| 2003/0023847 A1* | 1/2003 | Ishibashi et al. | 713/169 |
| 2003/0028664 A1* | 2/2003 | Tan et al. | 709/237 |
| 2003/0033543 A1* | 2/2003 | Hubbard et al. | 713/201 |
| 2003/0035548 A1* | 2/2003 | Kwan | 380/286 |
| 2003/0041250 A1* | 2/2003 | Proudler | 713/182 |
| 2003/0056099 A1* | 3/2003 | Asanoma et al. | 713/172 |
| 2003/0075610 A1 | 4/2003 | Ong | |
| 2003/0084292 A1* | 5/2003 | Pierce et al. | 713/168 |
| 2003/0093695 A1 | 5/2003 | Dutta | |
| 2003/0115455 A1 | 6/2003 | Aull et al. | |
| 2003/0115466 A1 | 6/2003 | Aull et al. | |
| 2003/0115467 A1* | 6/2003 | Aull et al. | 713/173 |
| 2003/0115468 A1 | 6/2003 | Aull et al. | |
| 2003/0128695 A1* | 7/2003 | Park | 370/352 |
| 2003/0163693 A1* | 8/2003 | Medvinsky | 713/169 |
| 2003/0167399 A1 | 9/2003 | Audebert et al. | |
| 2003/0172034 A1 | 9/2003 | Schneck et al. | |
| 2004/0042620 A1 | 3/2004 | Andrews et al. | |
| 2004/0053642 A1 | 3/2004 | Sandberg et al. | |
| 2004/0066274 A1 | 4/2004 | Bailey | |
| 2004/0078342 A1* | 4/2004 | Goldschmidt Iki et al. | 705/75 |
| 2004/0088562 A1 | 5/2004 | Vassilev et al. | |
| 2004/0096055 A1 | 5/2004 | Williams et al. | |
| 2004/0103324 A1 | 5/2004 | Band | |
| 2004/0103325 A1 | 5/2004 | Priebatsch | |
| 2004/0120525 A1* | 6/2004 | Miskimmin et al. | 380/277 |
| 2004/0144840 A1 | 7/2004 | Lee et al. | |
| 2004/0146163 A1 | 7/2004 | Asokan et al. | |
| 2004/0148502 A1* | 7/2004 | Gollner et al. | 713/167 |
| 2004/0153451 A1 | 8/2004 | Phillips et al. | |
| 2004/0162786 A1 | 8/2004 | Cross et al. | |
| 2004/0230831 A1 | 11/2004 | Spelman et al. | |
| 2004/0266523 A1* | 12/2004 | Gentles et al. | 463/29 |
| 2005/0022123 A1 | 1/2005 | Costantino | |
| 2005/0033692 A1* | 2/2005 | Jarman et al. | 705/41 |
| 2005/0033703 A1 | 2/2005 | Holdsworth | |
| 2005/0076209 A1* | 4/2005 | Proudler | 713/165 |
| 2005/0109841 A1 | 5/2005 | Ryan et al. | |
| 2005/0114673 A1 | 5/2005 | Raikar et al. | |
| 2005/0119978 A1 | 6/2005 | Ates | |
| 2005/0123142 A1 | 6/2005 | Freeman et al. | |
| 2005/0138386 A1 | 6/2005 | Le Saint | |
| 2005/0138390 A1 | 6/2005 | Adams et al. | |
| 2005/0144312 A1 | 6/2005 | Kadyk et al. | |
| 2005/0154873 A1* | 7/2005 | Cam-Winget et al. | 713/150 |
| 2005/0184145 A1* | 8/2005 | Law et al. | 235/380 |
| 2005/0184163 A1 | 8/2005 | de Jong | |
| 2005/0184164 A1 | 8/2005 | de Jong | |
| 2005/0184165 A1 | 8/2005 | de Jong | |
| 2005/0188360 A1 | 8/2005 | de Jong | |
| 2005/0210279 A1* | 9/2005 | Lee et al. | 713/194 |
| 2005/0216732 A1 | 9/2005 | Kipnis et al. | |
| 2005/0262361 A1 | 11/2005 | Thibadeau | |
| 2005/0279827 A1 | 12/2005 | Mascavage et al. | |
| 2005/0289652 A1 | 12/2005 | Sharma et al. | |
| 2006/0005028 A1 | 1/2006 | Labaton | |
| 2006/0010325 A1 | 1/2006 | Liu et al. | |
| 2006/0015933 A1 | 1/2006 | Ballinger et al. | |
| 2006/0033608 A1* | 2/2006 | Juels et al. | 340/10.1 |
| 2006/0036868 A1 | 2/2006 | Cicchitto | |

| | | | |
|---|---|---|---|
| 2006/0043164 A1 | 3/2006 | Dowling et al. | |
| 2006/0069655 A1* | 3/2006 | Athens et al. | 705/67 |
| 2006/0072747 A1 | 4/2006 | Wood et al. | |
| 2006/0073812 A1 | 4/2006 | Punaganti Venkata et al. | |
| 2006/0075133 A1* | 4/2006 | Kakivaya et al. | 709/237 |
| 2006/0075486 A1 | 4/2006 | Lin et al. | |
| 2006/0085640 A1* | 4/2006 | Tardo et al. | 713/168 |
| 2006/0101111 A1 | 5/2006 | Bouse et al. | |
| 2006/0101506 A1* | 5/2006 | Gallo et al. | 726/3 |
| 2006/0105741 A1* | 5/2006 | Suh et al. | 455/410 |
| 2006/0173848 A1 | 8/2006 | Peterson et al. | |
| 2006/0174104 A1 | 8/2006 | Crichton et al. | |
| 2006/0198517 A1* | 9/2006 | Cameron et al. | 380/44 |
| 2006/0206932 A1* | 9/2006 | Chong | 726/10 |
| 2006/0208066 A1 | 9/2006 | Finn et al. | |
| 2006/0226243 A1 | 10/2006 | Dariel | |
| 2006/0291664 A1 | 12/2006 | Suarez et al. | |
| 2006/0294583 A1 | 12/2006 | Cowburn et al. | |
| 2007/0014416 A1 | 1/2007 | Rivera et al. | |
| 2007/0027696 A1* | 2/2007 | Burger | 705/1 |
| 2007/0067618 A1* | 3/2007 | Sandhu et al. | 713/155 |
| 2007/0074034 A1 | 3/2007 | Adams et al. | |
| 2007/0112721 A1 | 5/2007 | Archbold et al. | |
| 2007/0113267 A1 | 5/2007 | Iwanski et al. | |
| 2007/0113271 A1 | 5/2007 | Pleunis | |
| 2007/0118891 A1 | 5/2007 | Buer | |
| 2007/0162987 A1 | 7/2007 | de Jong et al. | |
| 2007/0168276 A1* | 7/2007 | Glodjo et al. | 705/37 |
| 2007/0169084 A1 | 7/2007 | Frank et al. | |
| 2007/0189534 A1 | 8/2007 | Wood et al. | |
| 2007/0204333 A1 | 8/2007 | Lear et al. | |
| 2007/0230706 A1 | 10/2007 | Youn | |
| 2007/0250712 A1* | 10/2007 | Salgado et al. | 713/171 |
| 2007/0271601 A1 | 11/2007 | Pomerantz | |
| 2007/0277032 A1 | 11/2007 | Relyea | |
| 2007/0280483 A1 | 12/2007 | Fu | |
| 2007/0282881 A1 | 12/2007 | Relyea | |
| 2007/0283163 A1 | 12/2007 | Relyea | |
| 2007/0283427 A1 | 12/2007 | Gupta et al. | |
| 2007/0288745 A1 | 12/2007 | Kwan | |
| 2007/0288747 A1* | 12/2007 | Kwan et al. | 713/156 |
| 2008/0005339 A1* | 1/2008 | Kwan et al. | 709/229 |
| 2008/0019526 A1 | 1/2008 | Fu | |
| 2008/0022086 A1 | 1/2008 | Ho | |
| 2008/0022088 A1 | 1/2008 | Fu et al. | |
| 2008/0022122 A1 | 1/2008 | Parkinson et al. | |
| 2008/0022128 A1 | 1/2008 | Proudler et al. | |
| 2008/0034216 A1 | 2/2008 | Law | |
| 2008/0046982 A1* | 2/2008 | Parkinson | 726/5 |
| 2008/0055629 A1* | 3/2008 | Kovnat | 358/1.15 |
| 2008/0056496 A1 | 3/2008 | Parkinson | |
| 2008/0059790 A1 | 3/2008 | Parkinson | |
| 2008/0059793 A1 | 3/2008 | Lord et al. | |
| 2008/0069338 A1 | 3/2008 | Relyea | |
| 2008/0069341 A1 | 3/2008 | Relyea | |
| 2008/0072283 A1 | 3/2008 | Relyea | |
| 2008/0077794 A1 | 3/2008 | Arnold et al. | |
| 2008/0077803 A1 | 3/2008 | Leach et al. | |
| 2008/0098223 A1* | 4/2008 | Tan et al. | 713/170 |
| 2008/0133514 A1 | 6/2008 | Relyea | |
| 2008/0148047 A1 | 6/2008 | Appenzeller et al. | |
| 2008/0165156 A1* | 7/2008 | Lapstun et al. | 345/173 |
| 2008/0183992 A1* | 7/2008 | Martin et al. | 711/162 |
| 2008/0189543 A1 | 8/2008 | Parkinson | |
| 2008/0209224 A1 | 8/2008 | Lord | |
| 2008/0209225 A1 | 8/2008 | Lord | |
| 2008/0229401 A1 | 9/2008 | Magne | |
| 2009/0003608 A1 | 1/2009 | Lee et al. | |
| 2009/0132649 A1* | 5/2009 | Hubbard | 709/203 |
| 2009/0133107 A1 | 5/2009 | Thoursie | |
| 2009/0138551 A1* | 5/2009 | Hubbard | 709/203 |
| 2009/0171855 A1* | 7/2009 | Hubbard | 705/80 |
| 2009/0280744 A1* | 11/2009 | Brown et al. | 455/41.2 |
| 2010/0195824 A1* | 8/2010 | Lin et al. | 380/44 |
| 2010/0235633 A1* | 9/2010 | Asano et al. | 713/167 |
| 2010/0313027 A1 | 12/2010 | Taylor | |
| 2011/0173247 A1* | 7/2011 | Hubbard et al. | 709/203 |

OTHER PUBLICATIONS

AMD Announces Specification for Open Platform Management Architecture, Feb. 28, 2005, pp. 1-2 http://www.thefreelibrary.com/AMD+Announces+Specification+for+Open+Plafform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Secure Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS# v2.20: Cryptographic Token Interface Standard, RSA Laboratories, Jun. 28, 2004 (see, e.g. Chapter 10, Objects) (see www.rsasecurity.com, 407 pgs).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

Schneier, Bruce. Applied Cryptography, Second Edition, 1996 John Wiley and Sons, pp. 480-481.

\* cited by examiner

METHODS AND SYSTEMS FOR SERVER-SIDE KEY GENERATION

RELATED APPLICATIONS

This application is related to pending U.S. patent application Ser. No. 11/446,956, entitled "Methods and Systems For Key Escrow" filed concurrently and commonly assigned and U.S. patent application Ser. No. 11/447,196, entitled "Methods And Systems For Secure Key Delivery," filed concurrently and commonly assigned.

FIELD

This invention generally relates to secure client-server systems. More particularly, the invention relates to a method and system for key escrow in a secure client-server system.

DESCRIPTION OF THE RELATED ART

Although smart cards are often compared to hard drives, they are "secured drives with a brain"—they store and process information. Smart cards are storage devices with the core mechanics to facilitate communication with a reader or coupler. They have file system configurations and the ability to be partitioned into public and private spaces that can be made available or locked. They also have segregated areas for protected information, such as certificates, e-purses, and entire operating systems. In addition to traditional data storage states, such as read-only and read/write, some vendors are working with sub-states best described as "add only" and "update only."

The physical characteristics of smart cards are governed by international standards. For example, the size of a card is covered by ISO-7810. ISO-7816 and subsequent standards cover manufacturing parameters, physical and electrical characteristics, location of the contact points, communication protocols, data storage, and more. Data layout and format, however, can vary from vendor to vendor.

Smart cards are a way to increase security especially for enterprise systems. Enterprise system often contain valuable information such as financial data, personnel records, strategies, etc., that may be critical for the entity administrating the enterprise system. Moreover, smart cards may offer a method to control access to data within the enterprise systems. Accordingly, the reasons to use smart card are plentiful.

However, there are drawbacks and disadvantages to smart cards. For example, if a user loses or has the smart card, the user cannot access the information. The user may obtain a replacement smart card for access, but the system administrator may have to perform a substantial number of tasks to allow the user to regain access to his original data.

Smart cards that follow generally accepted best practices do not allow a key to be extracted from the smart card. Thus, archiving of a copy of a key for later restoration, the key has to be generated outside the device.

Therefore, there is a need for a method and system to encrypt a key or key password to allow the key or key password to be securely stored and to allow the encrypted key or key password to be recovered by the principal or his or her organization if the private key or key password is lost or otherwise unavailable to a person authorized to use it.

SUMMARY

An embodiment pertains generally to a method of generating credentials for a token. The method includes detecting the token and the server determining that the token is to be enrolled and generating a subject key pair within the server, where the subject key pair includes a subject public key and the subject private key. The method also includes encrypting the subject private key with a key transport session key to arrive at a wrapped private key and forwarding the wrapped private key to the token.

Another embodiment relates generally to a system for generating credentials for a token. The system includes a a token, a security client configured to manage the token, and a security server configured to interface with the security client. The security server is configured to to detect the token to be enrolled by the security server and generate a subject key pair within the security server, where the subject key pair includes a subject public key and the subject private key. The security server is also configured to encrypt the subject private key with a key transport session key to arrive at a wrapped private key and forward the wrapped private key to the token.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

Figure 1:
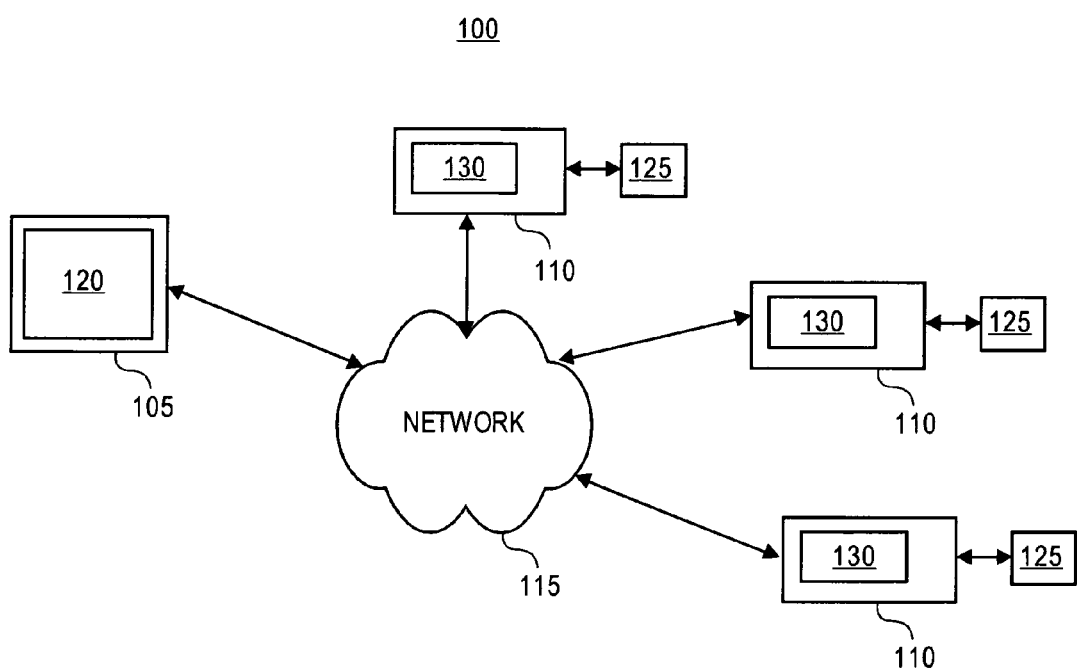
FIG. 1 illustrates an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of secure distributed environments and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to an enterprise security (ES) system executing on a server with a security client executing on a user desktop (erg., Windows, Linux, Mac). The security client may be configured to interface with the ES system and provide an interface to manage a smart card, communicate with ES system, act as a proxy for application program data units (APDUs) sent between the ES system and the smart card, and display user interfaces (UIs) as the ES system directs (for example, prompting user for credentials and/or PIN, displaying smart card status, etc.).

The ES system may include a token management system (TMS, or a security server). The TMS may be configured to act as the registration authority and to direct the entire enrollment process. The TPS may also be configured as the only entity in the ES system to construct the APDUs, which are the message format understood by the smart card. The TMS may interface with a token processing system (TPS) to a token key service (TKS) module, a data recovery manager (DRM) module and a certificate authority (CA) module through a firewall.

In various embodiments, smart cards (more generally tokens) may be configured to store an applet (a small application) and three keys. The three keys may be derived from a master key held by the manufacturer and the card identification number. The derivation of the keys may be implemented by applying a pre-defined function(s) to the master key and the card identification number. One of the keys may be a key encryption key, KEK. The security client may detect the presence of an inserted token in an associated card reader and inform TPS of the token.

The TPS may begin an initialization process that may include the TPS determining whether the applet on the token is outdated and whether the master key has changed since the three keys stored on the token were generated. If any of these conditions are true, the TPS may perform a "key update" in the event of the outdated master key and an "applet upgrade" in the event of outdated applet. As part of the update, the TPS may deliver new keys (derived within the TMS system from the new master key) and/or an updated applet to the token to be stored/injected therein.

The TPS may also determine that the token may need to initialized with server-side generated keys and key archival for those generated keys. More specifically, the TPS may be configured to provide tools that allow a system administrator to set policies to manage users. For example, the system administrator may set a policy where a group of users may have their tokens be enrolled with server-side key generation and key archival of those generated keys.

Accordingly, the security client may transmit a serial number, card unique identification, or card identification (CID) to the TPS of the TMS. The TPS may be configured to forward the CID of the token to the the TKS module. The TKS module may be configured to derive a series of keys based on the server master key and the CID. One of the derived keys is the key encryption key, KEK, which is configured to encrypt other secret keys. The TKS module is also configured to generate a key transport session key, KTSK. The TKS module may encrypt the key transport session key, KTSK, with the key encryption key, KEK, i.e., wrap, to arrive at a first encrypted or wrapped key transport session key, KEK (KTSK).

The TKS module may be initially configured to hold a public key of the DRM module, which for the sake of convenience will be referred as a server transport key, STK. The TKS module may include an encrypted secure database where the server transport key, STK, is stored. The TKS module may wrap the key transport session key, KTSK, with the server transport key, STK, to arrive at a second wrapped key transport session key, STK(KTSK). The TKS module may forward the first wrapped key transport session key, KEK(KTSK) and the second wrapped transport session key STK(KTSK) to the TPS.

The TPS may be configured to forward the second wrapped server transport key, STK(KTSK) and the server-side key generation request to the DRM module while temporarily holding the first wrapped key transport session key, KEK (KTSK). The DRM module may be configured to generate an asymmetric key pair, i.e., a subject public and a subject private (SPuK/SPrivK, respectively) key pair, where the subject may represent a user, device, or other entity such as organization, association, etc.

The DRM module may retrieve a storage key, SK, which may be a permanent private storage key owned by the DRM module and generate a storage session key, SSK. The DRM module may encrypt or wrap the subject private key, SPrivK, with the storage session key, SSK, to arrive at a wrapped storage private key, SSK(SPrivK). The DRM module may also encrypt the storage session key, SSK, with the storage key, SK, to arrive at a wrapped storage session key, SK(SSK). The wrapped storage private key, SSK(SPrivK) and the storage session key, SSK, may then be archived or escrowed by the DRM module. The archived keys (SSK(SPrivK) and SK(SSK)) may be used for later recovery in the event of a lost or destroyed token.

The DRM module may then decrypt, i.e., unwrap, the second wrapped transport session key, STK(KTSK), with the complementary key of the server transport key, STK, stored in the DRM module to retrieve the key transport session key, KTSK. The DRM module may then wrap the subject private key, SPrivK, with the key transport session key as a wrapped private key, KTSK(SPrivK) and forward the wrapped private key, KTSK(SPrivK) and the subject public key, SPuK, to the TPS.

The TPS may forward the wrapped private key, KTSK (SPrivK) and the first wrapped key transport session key, KEK(KTSK), to the security client to write into the token. The forwarded wrapped keys (KEK(KTSK) and KTSK (SPrivK)) are received at the token to be injected therein. For the sake of completeness, the token may execute an applet that can retrieve the key encryption key, KEK, which the manufacturer had derived and stored or the TMS has updated and stored Accordingly, the applet may unwrap the first wrapped key transport session key, KEK(KTSK) to retrieve the key transport session key, KTSK. The applet then uses the key transport session key to unwrapped the wrapped private key, KTSK(SPrivK) to retrieve the subject private key, SPrivK.

The TPS may be further configured to send a certificate enrollment request with the information regarding the subject public key, SPuK, to the CA module for certificates for the token. The TPS may subsequently forward received certificates from the CA module to the token. Subsequently, the certificates are written into the token.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a token management system 120 through a multiple user operating system (not shown) in conjunction with the clients 110. The server 105 may be implemented with server platforms as known to those skilled in the art from Intel, Advanced Micro Devices, Hewlett-Packard, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 may be computing machine or platform (machine) configured to execute secure and open applications through the multi-user operating system. The clients 110 may be implemented with personal computers, workstations, thin clients, thick clients, or other similar computing platform.

The clients 110 may use operating systems such as Linux, Windows, Macintosh or other available operating system.

Each client 110 may be configured to interface with a security device 125. The security device 125 may be configured to act as a gatekeeper to the client 110. More particularly, a user may use a security token, such as a smart card, to access the respective client 110. Each client 110 may have a security client 130 executing to monitor the security device 125.

The security client 130 may be configured to manage the token. More specifically, the security client 130 may enroll the token, recovery keys for the token or reset a personal identification number for the token. The security client 130 may also be configured to interface with the token management system 120 and act as a proxy for application program data units (APDUs) between the token management system 120 and the token. The security client 130 may be further configured to display user interfaces as the token processing system 120 directs, i.e., prompting the user for credentials and/or PIN, displaying token status.

In some embodiments, the token management 120 may initiate token enrollment. The security client 130 may detect the presence of the inserted security token and notifies the token management system 120. The token management 120 may prompt the security client 130 to display a user interface querying the user to begin the enrollment process. The security client 130 may forward a card identification (CID) of the token. The CID uniquely identifies the token and is set during the manufacture of the token.

Figure 2:
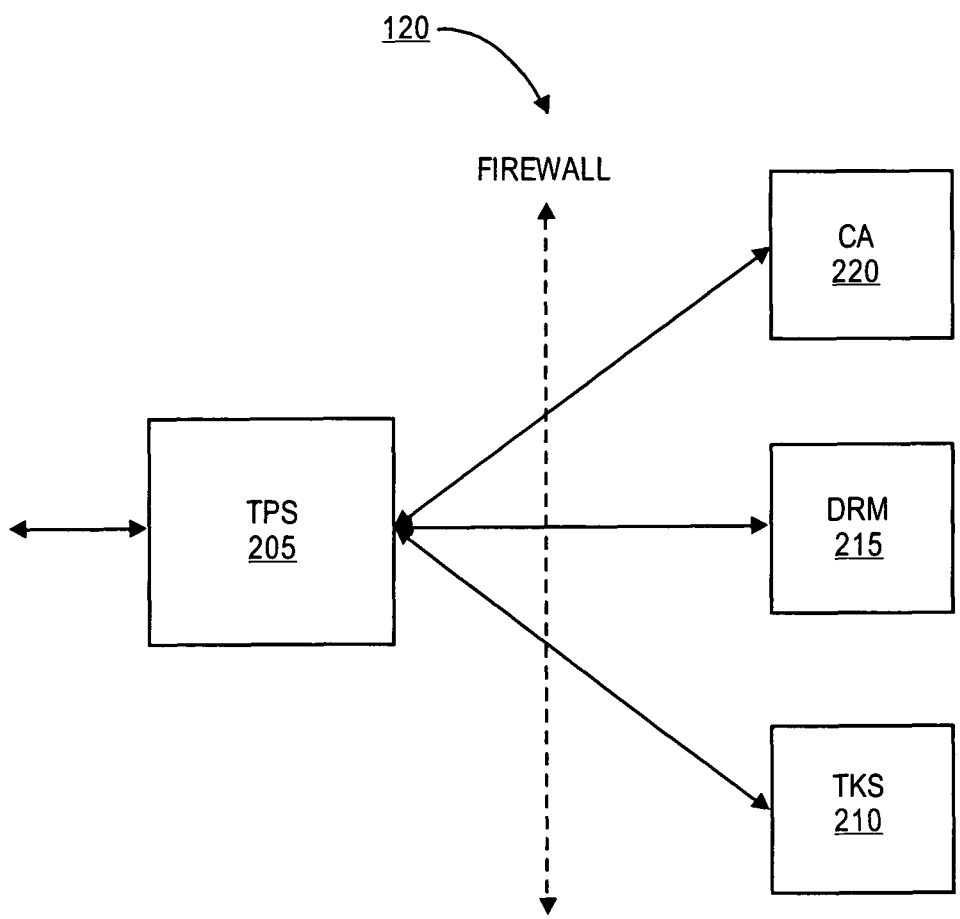
FIG. 2 illustrates an architectural diagram of the security client and server in accordance with another embodiment.

The token management system 120 comprises of several modules, as depicted in FIG. 2. FIG. 2 shows an exemplary architecture of the token management system 120 in accordance with another embodiment. It should be readily apparent to those of ordinary skill in the art that the token management system 120 depicted in FIG. 2 represents a generalized schematic illustration and that other components may be added or existing components may be removed or modified. Moreover, the token management system 120 may be implemented using software components, hardware components, or combinations thereof.

As shown in FIG. 2, the token management system 120 includes a token processing system (labeled as TPS in FIG. 2) 205, a token key service (TKS) module 210, a data recovery manager (DRM) module 215 and a certificate authority (CA) module 220. The TPS 205 may be configured to act as a registration authority. The TPS 205 may direct the enrollment process. The TPS 205 may be configured to act a gateway between security clients 130 and tokens and the modules of the token management system 120.

The TKS module 210 may be configured to maintain master keys for the tokens. The TKS module 210 may also store symmetric keys associated with the token. These keys may be derived from a single master key combined with smart card serial number or identification number, i.e., the CID. The manufacturer of the smart card may store these symmetric keys onto the token. The manufacturer may also forward the single master key to the administrator of the token management system 120, who installs the key into the TKS module 210. For server side key generation requests, the manufacturer installed symmetric keys are replaced with the server generated keys which are derived the server master key. The TKS module 210 may also be configured to hold a public key of the DRM module 215 as a server transport key, STK, in an encrypted secure database.

The DRM module 215 may be configured to maintain a database of encrypted subject's private keys, which can be recovered on demand by an appropriate process. The DRM module 215 may also be configured to generate a subject public key (SPuK) and a subject private key (SPrivK), where the subject may represent a user, device, or other entity such as organization, association, etc. The DRM module 215 may be further configured to retrieve a storage key, SK. The storage key, SK, may be a private permanent storage key owned by the DRM module 215. The DRM module 215 may generate a storage session key, SSK, to encrypt the subject private key, SPrivK, with the storage session key, SSK, to arrive at a wrapped private key, SSK(SPrivK) and encrypt the storage session key, SSK, with the storage key, SK, to arrive at a wrapped storage session key, SK(SSK). These wrapped keys, SSK(SPrivK) and SK(SSK) are archived or escrowed for later recovery.

The CA module 220 may be configured to generate X.509 certificates in response to received subject public key information and certificate enrollment requests.

In various embodiment, the TPS 205 may receive an enrollment request with a server-side generation request and CID from the security client 130. The TPS 205 may forward the CID of the token 130 from the enrollment request to the TKS module 210. The TKS module 210 may be configured to derive a key encryption key, KEK, that is used in encrypting other secret keys intended for the specific token within the token management system 120. More particularly, the TKS module 120 may be configured to apply a pre-defined function is used to derive the key encryption key, KEK, based on the CID from the token 130. The TKS module 210 may also generate a key transport session key, KTSK. The TKS module 210 may encrypt the key transport session key (KTSK) with the key encryption key (KEK) to arrive at a first encrypted or wrapped key transport session key, KEK(KTSK).

The TKS module 210 may retrieve a server transport key, STK, where the server transport key may be a public key issued by the DRM module 215. The TKS module 210 may wrap the key transport session key, KTSK, with a server transport key, STK, to arrive at a second wrapped key transport session key, STK(KTSK). The TKS module 210 may forward the first wrapped key transport session key, KEK (KTSK) and the second wrapped key transport session key STK(KTSK) to the TPS 205.

The TPS 205 may be configured to forward the second wrapped key transport session key, STK(KTSK) and the server-side key generation request to the DRM module 215 while temporarily holding the first wrapped key transport session key, KEK(KTSK). The DRM module 215 may be configured to generate an asymmetric key pair, i.e., a subject public and a private (SPuK/SPrivK) key pair in response to receiving a server-side key generation request, where the subject may represent a user, device or other entity such as an organization, association, etc.

The DRM module 215 may also be configured to retrieve a storage key, SK, which is a permanent private storage key owned by the DRM module 215 and to generate a storage session key, SSK. The DRM module 215 may then wrap the subject private key, SPrivK with the storage session key, SSK, i.e., STK(SPrivK) and wrap the storage session key, SSK, with the storage key, SK, i.e., SK(SSK). The DRM module 215 may then archive or escrow these wrapped keys for later recovery in the event of a lost or destroyed token.

The DRM module 215 may be further configured to decrypt the second wrapped transport key, STK(KTSK), to obtain the key transport session key, KTSK with the complementary key of the of the server transport key used in the TKS module 210. The server transport key and its complementary key may be symmetric or asymmetric as long as they are shared between the DRM module 215 and the TKS module 210. The DRM module 215 may then wrap the subject private key, SPrivK, with the key transport session key, KTSK, as a wrapped private key, KTSK(SPrivK). The DRM module 215 may forward the wrapped private key, KTSK(SPrivK) and the subject public key, SPuK, to the TPS 205.

The TPS 205 may forward the wrapped private key, KTSK (SPrivK) and the first wrapped key transport session key, KEK(KTSK), to the security client 130 to write into the token. The forwarded wrapped keys (KEK(KTSK) and KTSK(SPrivK)) are received at the token to be injected therein. For the sake of completeness, the token may execute an applet that can retrieve the key encryption key. Accordingly, the applet may unwrap the first wrapped key transport session key, KEK(KTSK) to retrieve the key transport session key, KTSK. The applet then uses the key transport session key, KTSK, to unwrap the wrapped private key, KTK (SPrivK) to retrieve the subject private key, SPrivK. SPuK can either be injected or derived from SPrivK.

The TPS 205 may be further configured to send a certificate enrollment request along with information related to the subject public key, SPuK, to the CA module 220 for certificates for the token. The TPS 205 may subsequently forward received certificates from the CA module 220 to the security client 130. Subsequently, the certificates are written into the token.

Figure 3:
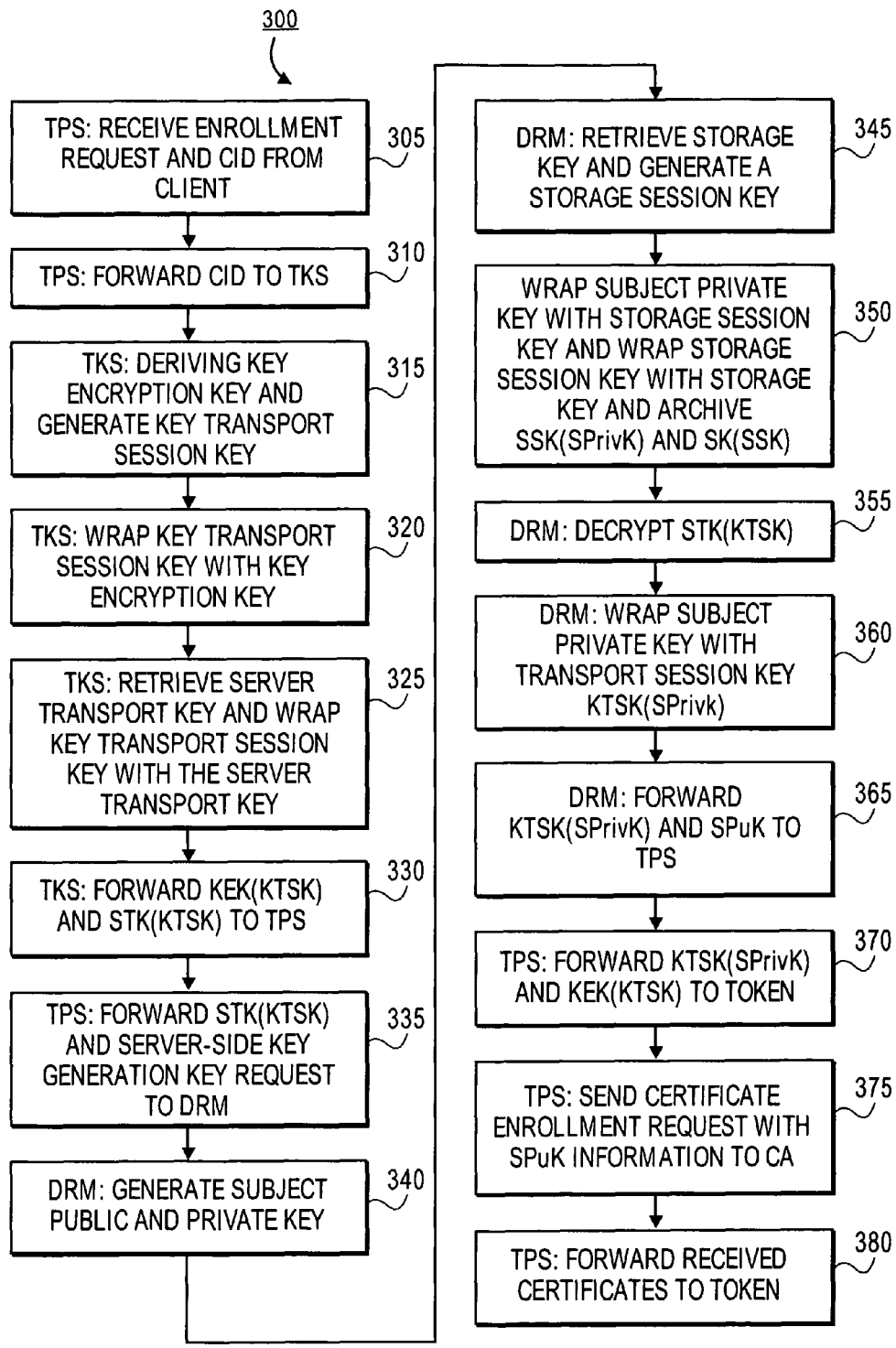
FIG. 3 illustrates an exemplary flow diagram in accordance with yet another embodiment.

FIG. 3 illustrate a flow diagram 300 executed by the token management system 120 in accordance with another embodiment. It should be readily apparent to those of ordinary skill in the art that the flow diagram 300 depicted in FIG. 3 represents a generalized illustration and that other steps may be added or existing steps may be removed or modified.

As shown in FIG. 3, the the TPS 205 may receive an enrollment request and the CID from the security client 130 because the user has inserted a new token in the security device 125, in step 305. The TPS 205 may determine that the inserted token requires server-side key generation and key archiving based on configuration policies set up by the system administrator. Alternatively, in other embodiments, the user of the token may request server-side key generation and/or key archiving. Subsequently, the TPS 205 may forward the CID to the TKS module 210, in step 310.

In step 315, the TKS module 210 may be configured to derive a key encryption key, KEK. Within the TKS module 210, the key encryption key, KEK, may be derived by applying a pre-define function to the server master key and the CID. The key encryption key, KEK, may be configured to encrypt other secret keys intended for the inserted token that is associated, i.e., owns, the KEK in the token management system 120. The TKS module 210 may also be configured to generate a key transport session key, KTSK, for use in the duration of an enrollment or a recovery session.

In step 320, the TKS module 210 may encrypt the key transport session key, KTSK, with the key encryption key, KEK, to arrive at a first encrypted or wrapped key transport session key, KEK(KTSK). In step 325, the TKS module 210 may retrieve a server transport key, STK, and wrap the key transport session key (KTSK) with the server transport key, STK, to arrive at a second wrapped key transport session key, STK(KTSK).

In step 330, the TKS module 210 may forward the first wrapped key transport session key, KEK(KTSK) and the second wrapped key transport session key, STK(KTSK) to the TPS 205. In step 335, the TPS 205 may be configured to forward the second wrapped key transport session key, STK (KTSK), and the server-side key generation request to the DRM module 215 while temporarily holding the first wrapped key transport session key, KEK(KTSK).

In step 340, the DRM module 215 may be configured to generate an asymmetric key pair, i.e., a subject public and a private (SPuK/SPrivK, respectively) key pair in response to receiving the server-side key generation request from the TPS 205. In step 345, the DRM module 215 may also be configured to retrieve a storage key, SK, and generate a storage session key, SSK.

In step 350, the DRM module 215 may be further configured to wrap the subject private key, SPrivK, with the storage session key, SSK, to arrive at a wrapped storage private key, SSK(SPrivK). The DRM module 215 may also wrap the storage session key, SSK, with the storage key, SK, to arrive at a wrapped storage session key, SK(SSK). These wrapped keys, SSK(SPrivK) and SK(SSK), may be stored or escrowed in the DRM module 215.

In step 355, the DRM module 215 may decrypt, i.e., unwrap, the second wrapped key transport session key, STK (KTSK) with the complementary key of the server transport key, STK, used in the TKS module 210. In step 360, the DRM module 215 may then wrap the subject private key, SPrivK, with the key transport session key, KTSK as a wrapped private key, KTSK(SPrivK). In step 365, the DRM module 215 may forward the wrapped private key, KTSK(SPrivK) and the subject public key, SPuK to the TPS 205.

In step 370, the TPS 205 may forward the wrapped private key, KTSK(SPrivK) and the first wrapped key transport session key, KEK(KTSK), to the security client 130 to write into the token. The forwarded wrapped keys are received at the token to be injected therein.

In step 375, the TPS 205 may be further configured to send a certificate enrollment request with information related to the subject public key, SPuK, to the CA module 220 for certificates for the token. In step 380, the TPS 205 may subsequently forward received certificates from the CA module 220 to the security client 130. Subsequently, the certificates are written into the token.

Figure 4:
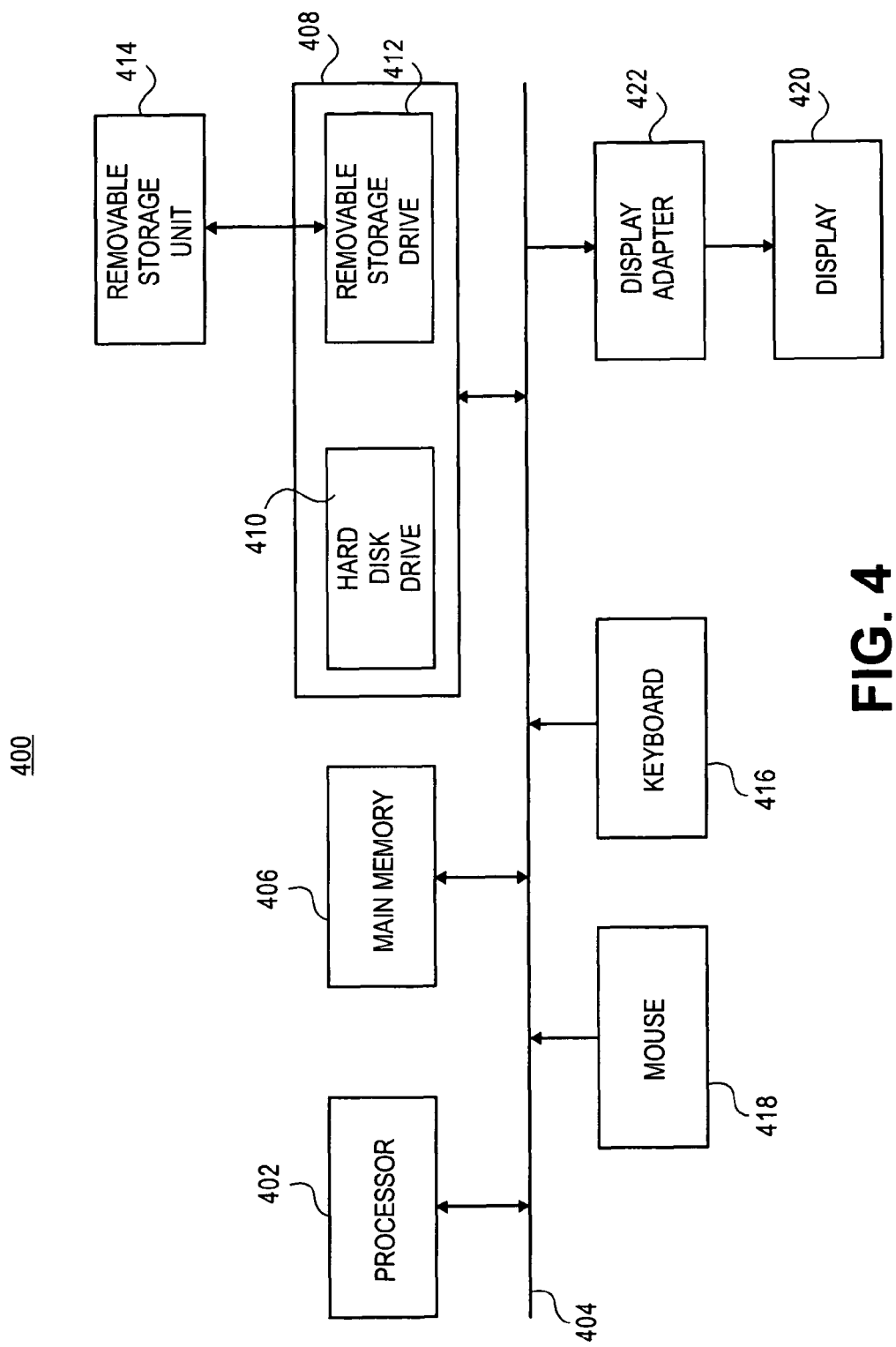
FIG. 4 illustrates an exemplary computing machine.

FIG. 4 illustrates an exemplary block diagram of a computing platform 400 where an embodiment may be practiced. The functions of the security client and token management system may be implemented in program code and executed by the computing platform 400. The security client and token management system may be implemented in computer languages such as PASCAL, C, C++, JAVA, etc.

As shown in FIG. 4, the computer system 400 includes one or more processors, such as processor 402 that provide an execution platform for embodiments of the security client and token management system. Commands and data from the processor 402 are communicated over a communication bus 404. The computer system 400 also includes a main memory 406, such as a Random Access Memory (RAM), where the security client and token management system may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the security client and token management system may be stored. The removable storage drive 412 reads from and/or writes to a removable storage unit 414 in a well-known manner. A user interfaces with the security client and token management system with a keyboard 416, a mouse 418, and a display 420. The display adapter 422 interfaces with the communication bus 404 and the display 420 and receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   transmitting, by a computer system, a request for a subject key pair;
   receiving by the computer system, in response to the request, a subject private key that has been encrypted with a session key, and a subject public key;
   transmitting to a token, by the computer system, (i) the encrypted subject private key, and (ii) the session key encrypted with a symmetric key that is based on the token and a master key;
   transmitting to a certificate authority, by the computer system, a certificate enrollment request with information pertaining to the subject public key;
   receiving, by the computer system, a certificate in response to the certificate enrollment request;
   generating a storage session key;
   encrypting the subject private key with the storage session key;
   retrieving a storage private key;
   encrypting the storage session key with the storage private key; and
   storing (i) the subject private key encrypted with the storage session key, and (ii) the encrypted storage session key.

2. The method of claim 1, further comprising receiving, by the computer system, an identification number associated with the token.

3. The method of claim 2, further comprising:
   deriving, by the computer system, the symmetric key based on the server master key and the identification number;
   generating, by the computer system, the session key; and
   encrypting, by the computer system, the session key with the symmetric key.

4. The method of claim 3, further comprising retrieving a server transport key from a data recovery manager.

5. The method of claim 4, further comprising encrypting, by the computer system, the session key with the server transport key.

6. The method of claim 5, further comprising:
   decrypting, by the computer system, the session key with a complementary private key of the server transport key to retrieve the session key; and
   encrypting, by the computer system, the subject private key with the session key.

7. An apparatus comprising:
   a memory to store a session key; and
   a processor to:
      transmit a request for a subject key pair,
      receive, in response to the request, a subject private key that has been encrypted with the session key, and a subject public key,
      transmit to a token (i) the encrypted subject private key and (ii) the session key encrypted with a symmetric key that is based on the token and a master key,
      transmit to a certificate authority a certificate enrollment request with information pertaining to the subject public key;
      receive a certificate in response to the certificate enrollment request,
      generate a storage session key,
      encrypt the subject private key with the storage session key,
      retrieve a storage private key,
      encrypt the storage session key with the storage private key; and
      store in the memory (i) the subject private key encrypted with the storage session key, and (ii) the encrypted storage session key.

8. The apparatus of claim 7, wherein the processor is further to receive an identification number associated with the token.

9. The apparatus of claim 8, wherein the processor is further to:
   derive the symmetric key based on the server master key and the identification number;
   generate the session key; and
   encrypt the session key with the symmetric key.

10. The apparatus of claim 9, wherein the processor is further to retrieve a server transport key from a data recovery manager.

11. The apparatus of claim 10, wherein the processor is further to encrypt the session key with the server transport key.

12. The apparatus of claim 11, wherein the processor is further to:
    decrypt the session key with a complementary private key of the server transport key to retrieve the session key; and
    encrypt the subject private key with the session key.

13. A non-transitory computer readable storage medium comprising instructions for causing a computer system to perform operations comprising:
    transmitting, by the computer system, a request for a subject key pair;
    receiving by the computer system, in response to the request, a subject private key that has been encrypted with a session key, and a subject public key;

transmitting to a token, by the computer system, (i) the encrypted subject private key, and (ii) the session key encrypted with a symmetric key that is based on the token and a master key;

transmitting to a certificate authority, by the computer system, a certificate enrollment request with information pertaining to the subject public key; and receiving, by the computer system, a certificate in response to the certificate enrollment request;

generating a storage session key;

encrypting the subject private key with the storage session key;

retrieving a storage private key;

encrypting the storage session key with the storage private key; and storing (i) the subject private key encrypted with the storage session key, and (ii) the encrypted storage session key.

14. The non-transitory computer readable storage medium of claim 13, wherein the operations further comprise receiving, by the computer system, an identification number associated with the token.

15. The non-transitory computer readable storage medium of claim 14, wherein the operations further comprise:

deriving, by the computer system, the symmetric key based on the server master key and the identification number;

generating, by the computer system, the session key; and encrypting, by the computer system, the session key with the symmetric key.

16. The non-transitory computer readable storage medium of claim 15, wherein the operations further comprise retrieving a server transport key from a data recovery manager.

17. The non-transitory computer readable storage medium of claim 16, wherein the operations further comprise encrypting, by the computer system, the session key with the server transport key.

18. The non-transitory computer readable storage medium of claim 17, wherein the operations further comprise:

decrypting, by the computer system, the session key with a complementary private key of the server transport key to retrieve the session key; and encrypting, by the computer system, the subject private key with the session key.

* * * * *